US 10,858,113 B2

(12) United States Patent
Klimpel et al.

(10) Patent No.: US 10,858,113 B2
(45) Date of Patent: Dec. 8, 2020

(54) AIRCRAFT AIR CONDITIONING SYSTEM AND METHOD FOR OPERATING SUCH AN AIRCRAFT AIR CONDITIONING SYSTEM

(71) Applicant: Airbus Operations GmbH, Hamburg (DE)

(72) Inventors: Frank Klimpel, Hamburg (DE); Hans Brunswig, Hamburg (DE); Steffen Golle, Dresden (DE); Ullrich Hesse, Affalterbach (DE); Enrico Klausner, Dresden (DE); Mario Raddatz, Coswig (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 421 days.

(21) Appl. No.: 15/790,260

(22) Filed: Oct. 23, 2017

(65) Prior Publication Data

US 2018/0057174 A1    Mar. 1, 2018

Related U.S. Application Data

(63) Continuation of application No. PCT/EP2016/059046, filed on Apr. 22, 2016.

(30) Foreign Application Priority Data

Apr. 23, 2015  (DE) .................. 10 2015 207 436
Apr. 23, 2015  (DE) .................. 10 2015 207 439
Apr. 23, 2015  (DE) .................. 10 2015 207 447

(51) Int. Cl.
*B64D 13/08*   (2006.01)
*B64D 13/06*   (2006.01)
(Continued)

(52) U.S. Cl.
CPC ............. *B64D 13/06* (2013.01); *B64D 13/08* (2013.01); *F24F 5/00* (2013.01); *F25B 5/02* (2013.01);
(Continued)

(58) Field of Classification Search
CPC .................. B64D 13/02; B64D 13/06; B64D 2013/0603; B64D 2013/0625;
(Continued)

(56) References Cited

U.S. PATENT DOCUMENTS 3,153,331 A   10/1964  Rogers
4,434,624 A   3/1984  Cronin et al.
(Continued)

FOREIGN PATENT DOCUMENTS

CN   102892674 A   1/2013
CN   104276287 A   1/2015
(Continued)

OTHER PUBLICATIONS

Chinese Examination Report for corresponding Chinese Patent Application No. 201680023383.1 dated Oct. 23, 2019.
(Continued)

*Primary Examiner* — Jonathan Bradford
(74) *Attorney, Agent, or Firm* — Greer, Burns & Crain, Ltd.

(57) ABSTRACT

An aircraft air conditioning system includes an ambient air line configured to have ambient air flow therethrough and being connected to a mixer of the air conditioning system to feed ambient air to the mixer, and a recirculation air line configured to have recirculation air flow therethrough and being connected to the mixer to feed to the mixer recirculation air discharged from an aircraft area to be air conditioned. A refrigerating machine of the air conditioning system includes a refrigerant circuit configured to have a
(Continued)

refrigerant flow therethrough and being thermally coupled to the ambient air line and to the recirculation air line to transmit heat from the ambient air flowing through the ambient air line and from the recirculation air flowing through the recirculation air line to the refrigerant circulating in the refrigerant circuit, before the ambient air and the recirculation air are fed into the mixer.

10 Claims, 1 Drawing Sheet

(51) Int. Cl.
F24F 5/00 (2006.01)
F25B 5/02 (2006.01)
(52) U.S. Cl.
CPC ........... B64D 2013/0625 (2013.01); B64D 2013/0644 (2013.01); B64D 2013/0662 (2013.01); B64D 2013/0674 (2013.01); B64D 2013/0688 (2013.01); Y02T 50/40 (2013.01); Y02T 50/50 (2013.01)
(58) Field of Classification Search
CPC .... B64D 2013/0648; B64D 2013/0662; B64D 2013/0644; B64D 2013/0688; F25B 5/02; Y02T 50/56
See application file for complete search history.

(56) References Cited

U.S. PATENT DOCUMENTS

| | | | |
|---|---|---|---|
| 4,963,174 A | 10/1990 | Payne | |
| 5,086,622 A | 2/1992 | Warner | |
| 5,899,085 A * | 5/1999 | Williams | B64D 13/06 62/236 |
| 5,934,083 A * | 8/1999 | Scherer | B64D 13/08 62/172 |
| 9,394,055 B2 | 7/2016 | Markwart et al. | |
| 10,059,457 B2 | 8/2018 | Klimpel et al. | |
| 2010/0064701 A1 | 3/2010 | Bruno et al. | |
| 2010/0101251 A1 | 4/2010 | Kelnhofer | |
| 2014/0144163 A1 | 5/2014 | Klimpel et al. | |

FOREIGN PATENT DOCUMENTS

| | | |
|---|---|---|
| DE | 102008053668 | 5/2010 |
| EP | 2735510 | 5/2014 |
| EP | 2821346 | 1/2015 |
| GB | 773248 | 4/1957 |
| WO | 9203338 | 3/1992 |
| WO | 2014158280 | 10/2014 |

OTHER PUBLICATIONS

International Search Report, dated Jul. 4, 2016, priority document.
German Search Report, dated Apr. 19, 2016, priority document DE102015207447.1.
German Search Report, dated Apr. 19, 2016, priority document DE102015207436.6.
German Search Report, dated Apr. 19, 2016, priority document DE102015207439.0.
S. Golle, U. Hesse, M. Raddatz, E. Klausner, F. Klimpel: "Pneumatisch angetriebenes Kaltdampfkühlsystem für die Flugzeugklimatisierung", DKV-Tagung, Hannover, Nov. 20-22, 2014.
S. Golle, U. Hesse, F. Klimpel: "Pneumatically driven environmental control system in aircrafts based on a vapor-compression cycle" 15th International Refrigeration and Air conditioning Conference at Purdue, Jul. 14-17, 2014.

* cited by examiner

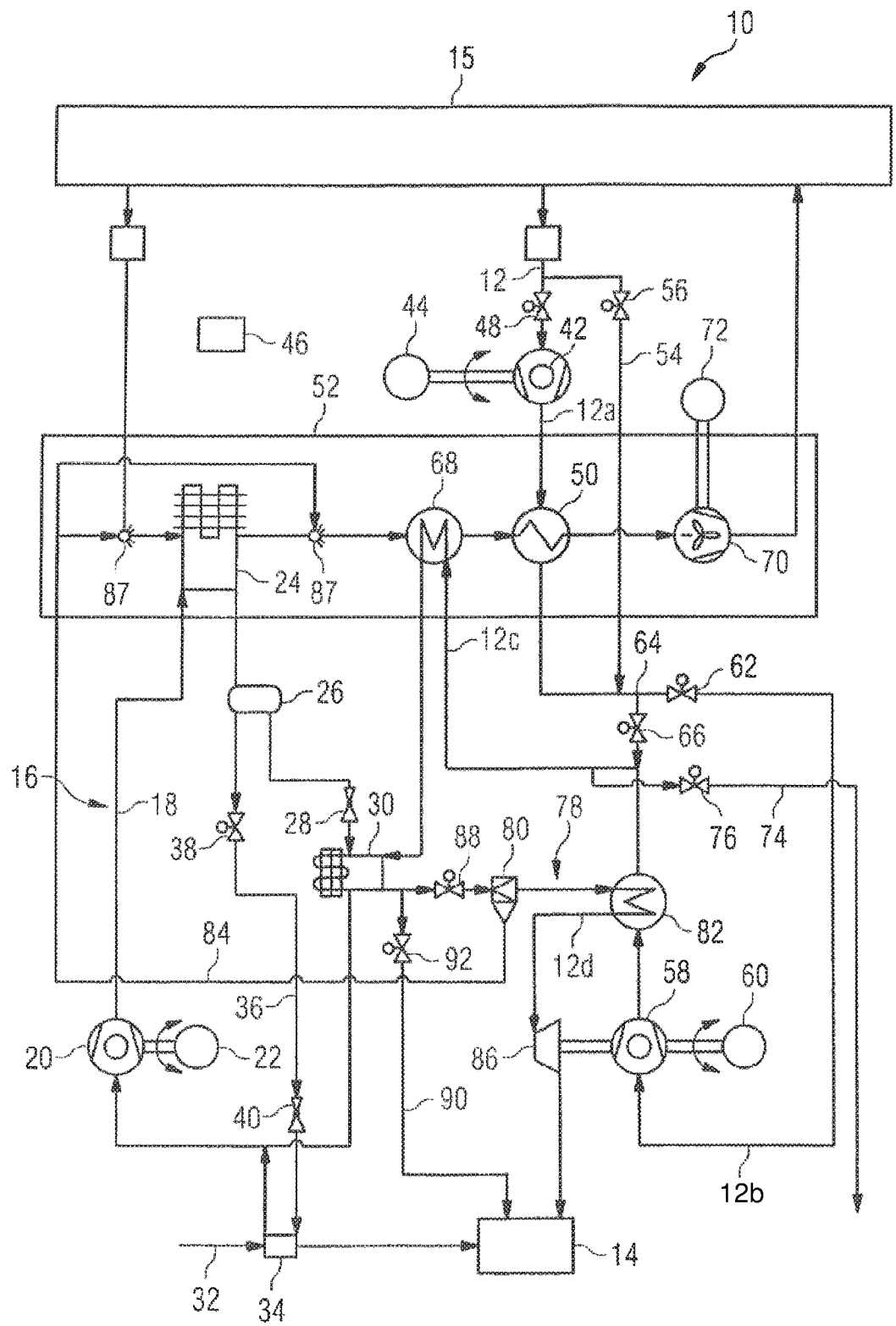

AIRCRAFT AIR CONDITIONING SYSTEM AND METHOD FOR OPERATING SUCH AN AIRCRAFT AIR CONDITIONING SYSTEM

CROSS-REFERENCES TO RELATED APPLICATIONS

This application is a continuation of International Application PCT/EP2016/059046 filed Apr. 22, 2016, designating the United States and published on Oct. 27, 2016 as WO 2016/170134. This application also claims the benefit of the German patent application Nos. 10 2015 207 436.6 filed on Apr. 23, 2015, 10 2015 207 439.0 filed on Apr. 23, 2015 and 10 2015 207 447.1 filed on Apr. 23, 2015. The entire disclosures of the above are incorporated herein by way of reference.

BACKGROUND OF THE INVENTION

The invention relates to an aircraft air conditioning system and a method for operating an aircraft air conditioning system.

An aircraft air conditioning system serves to set and maintain a desired pressure, a desired temperature and a desired atmospheric humidity in an aircraft cabin. In addition, the aircraft air conditioning system feeds into the aircraft cabin sufficient fresh air to ensure that a prescribed minimum quota of fresh air is present in the aircraft cabin. From EP 2 735 510 A1 and US 2014/0144163 A1, an aircraft air conditioning system is known in which a refrigerating machine which is operated with a two-phase refrigerant is used for the purpose of cooling ambient air which has been compressed by a multistage compressor. The refrigerating machine comprises a refrigerant circuit in which there are arranged a compressor, a condenser, an expansion valve and an evaporator through which ambient air to be cooled flows. Bleed air taken from an engine or auxiliary engine of the aircraft is used for driving the compressor of the refrigerating machine and also for driving the multistage compressor for compressing the ambient air.

DE 10 2008 053668 A1 describes an air conditioning installation for an aircraft with two decks, which installation comprises two air conditioning units which are connected to a central mixer and are operated with bleed air from an engine or auxiliary engine of the aircraft. The air conditioning installation also comprises two recirculation systems which are each associated with one of the two decks of the aircraft. A first recirculation system conveys recirculation air from a first aircraft cabin area into the central mixer, where the recirculation air is blended with cold air conditioning air made available by the air conditioning units. On the other hand, recirculation air conveyed from a second aircraft cabin area by a second recirculation system is blended, in two local mixers, with mixed air from the central mixer. The second recirculation system comprises a cooling unit which is arranged upstream of one of the local mixers, referred to the direction of flow of the recirculation air in the second recirculation system which has been discharged from the second aircraft cabin area, and is set up for the purpose of cooling, to a desired temperature, the recirculation air which has been discharged from the second aircraft cabin area, before it is fed into the local mixer.

SUMMARY OF THE INVENTION

An object of the invention is to make available an aircraft air conditioning system which permits energy-efficient air conditioning of an aircraft cabin. An object of the invention is also to indicate a method for operating an aircraft air conditioning system of this kind.

An aircraft air conditioning system comprises an ambient air line which is configured to have ambient air flow therethrough and which is connected to a mixer of the aircraft air conditioning system in order to feed to the mixer ambient air taken from an aircraft's surroundings. The mixer, which is in communication with the ambient air line, may be a pre-mixer or a main mixer of the aircraft air conditioning system. The aircraft air conditioning system also comprises a recirculation air line which is configured to have recirculation air flow therethrough and which is connected to the mixer of the aircraft air conditioning system in order to feed to the mixer recirculation air which has been discharged from an aircraft area to be air conditioned. In the mixer, the ambient air from the ambient air line is mixed with the recirculation air which has been discharged from the aircraft area to be air conditioned, for example, the aircraft cabin. The mixed air produced in the mixer is finally used for air conditioning the aircraft cabin.

A refrigerating machine of the aircraft air conditioning system comprises a refrigerant circuit which is configured to have a refrigerant flow therethrough and which is thermally coupled to the ambient air line in order to transmit heat from the ambient air flowing through the ambient air line to the refrigerant circulating in the refrigerant circuit, before the ambient air is fed into the mixer. The refrigerant circuit, which is configured to have a refrigerant flow therethrough, of the refrigerating machine is also thermally coupled to the recirculation air line in order to transmit heat, before the recirculation air is fed into the mixer, from the recirculation air flowing through the recirculation air line to the refrigerant circulating in the refrigerant circuit.

In the aircraft air conditioning system, the refrigerating machine is used, not only for cooling the ambient air flowing through the ambient air line, but also for cooling the recirculation air which has been discharged from the aircraft area to be air conditioned. Consequently, the recirculation air can be cooled, before it is fed into the mixer of the aircraft air conditioning system, to the same low temperature as the ambient air flowing through the ambient air line. It is therefore possible to dispense with cooling down the ambient air, by the transmission of heat to the refrigerant circulating in the refrigerant circuit of the refrigerating machine, to a temperature which lies below a desired set cabin feed air temperature. This permits particularly energy-efficient operation of the aircraft air conditioning system. Operation of the refrigerating machine at relatively high minimum refrigerant temperatures is also made possible, so that the risk of icing can be minimized for components which are arranged in the refrigerant circuit of the refrigerating machine.

The refrigerant circulating in the refrigerant circuit of the refrigerating machine is preferably a two-phase refrigerant which is transferred from the liquid into the gaseous state of aggregation on absorbing heat from the ambient air flowing through the ambient air line, and is then transferred back into the liquid state of aggregation again by suitably controlling the pressure and temperature in the refrigerant circuit of the refrigerating machine. For example, R134A ($CH_2F$—$CF_3$), $CO_2$ or R-245fa (1,1,1,3,3-pentafluoropropane) may be circulated as the two-phase refrigerant in the refrigerant circuit of the refrigerating machine. The cooling process employed for cooling the ambient air flowing through the ambient air line and the recirculation air flowing through the recirculation air line is consequently preferably carried out as a cold vapor process which is distinguished by high energy efficiency.

A refrigerant compressor may be arranged in the refrigerant circuit of the refrigerating machine. The refrigerant compressor is preferably driven by a first electric motor. There may also be arranged in the refrigerant circuit of the refrigerating machine a condenser, a refrigerant collector, an expansion valve and/or a heat exchanger, in particular an evaporator, which thermally couples the refrigerant circuit to the ambient air line. The pressure and temperature in the refrigerant circuit of the refrigerating machine are preferably controlled in such a way that the cold vapor process which is taking place in the refrigerant circuit predominantly takes place in the two-phase zone of the two-phase refrigerant, as a result of which isothermals and isobars coincide. The cold vapor process consequently approximates to the theoretical optimum Carnot cycle, as a result of which particularly efficient cooling of the ambient air flowing through the ambient air line is made possible.

The refrigerant circuit of the refrigerating machine may be thermally coupled to the recirculation air line via a further heat exchanger which is preferably constructed in the form of a further evaporator. The further heat exchanger is preferably arranged in a connecting line which branches off from the refrigerant collector arranged in the refrigerant circuit. The connection line may branch off from the refrigerant circuit of the refrigerating machine upstream of the heat exchanger which thermally couples the refrigerant circuit to the ambient air line and may open back into the refrigerant circuit of the refrigerating machine downstream of the heat exchanger which thermally couples the refrigerant circuit to the ambient air line. The terms "upstream" and "downstream" here refer to the direction of flow of the refrigerant through the refrigerant circuit. Such a design of the refrigerant circuit makes it possible to supply the heat exchanger used for cooling the ambient air flowing through the ambient air line, and the further heat exchanger used for cooling the recirculation air flowing through the recirculation air line, with refrigerant in parallel, and to regulate them independently of one another.

In particular, the connection line may branch off from the refrigerant collector arranged in the refrigerant circuit. The refrigerant collector then serves as a refrigerant buffer, which guarantees that both heat exchangers are adequately supplied with refrigerant.

There may be arranged in the connecting line a control valve which is configured to control the flow of refrigerant through the connecting line. By suitably controlling the control valve, the flow of refrigerant through the connecting line can be configured to the cooling requirement of the recirculation air to be cooled. It is also possible, by suitably controlling the control valve, to distribute the refrigerant circulating in the refrigerant circuit of the refrigerating machine, in dependence upon the cooling requirement of the ambient air to be cooled and in dependence upon the cooling requirement of the recirculation air to be cooled, to the heat exchanger for cooling the ambient air and to the further heat exchanger for cooling the recirculation air. This makes it possible, if necessary, to prioritize the heat exchanger or the further heat exchanger when supplying refrigerant.

A further expansion valve may also be arranged in the connecting line. By means of the further expansion valve, which is arranged in the connecting line upstream of the further heat exchanger, referred to the direction of flow of the refrigerant through the refrigerant circuit, it is possible to set the pressure and temperature of the refrigerant flowing through the connecting line as desired, before the refrigerant is conducted into the further heat exchanger.

In one preferred embodiment, the aircraft air conditioning system also comprises a control apparatus which is configured to control the flow of ambient air through the ambient air line in such a way that the ambient air is firstly conducted alternatively through either a first section of the ambient air line, or a first bypass line. There may be arranged in the first section of the ambient air line a first ambient air compressor, which is, for example, regulated in its rotational speed and preferably driven by a second electric motor, for compressing the ambient air flowing through the first section of the ambient air line. The first bypass line may run parallel to the first section of the ambient air line. Ambient air which flows through the first bypass line is conducted past the first section of the ambient air line and consequently past the first ambient air compressor.

The control apparatus of the aircraft air conditioning system may also be configured to control the flow of ambient air through the ambient air line in such a way that the ambient air is then conducted alternatively through either a second section of the ambient air line, or through a second bypass line. The second section of the ambient air line may be arranged downstream of the first section of the ambient air line and downstream of the first bypass line, referred to the direction of flow of the ambient air through the ambient air line. The ambient air fed to the second section of the ambient air line may consequently be conducted from the first section of the ambient air line or from the first bypass line into the second section of the ambient air line.

There may be arranged in the second section of the ambient air line a second ambient air compressor, which is, for example, regulated in its rotational speed and preferably driven by a third electric motor, for compressing the ambient air flowing through the second section of the ambient air line, under which circumstances the ambient air fed to the second ambient air compressor may be ambient air which has been pre-compressed in the first ambient air compressor, or ambient air which is conducted untreated to the second ambient air compressor through the first bypass line. The second bypass line may run parallel to the second section of the ambient air line. Ambient air which flows through the second bypass line is then conducted past the second section of the ambient air line and consequently past the second ambient air compressor.

The control apparatus of the aircraft air conditioning system is preferably also configured to control the flow of ambient air through the ambient air line in such a way that the ambient air is then conducted through a third section of the ambient air line. The third section of the ambient air line may be arranged downstream of the second section of the ambient air line and downstream of the second bypass line, referred to the direction of flow of the ambient air through the ambient air line. The ambient air fed to the third section of the ambient air line may consequently be conducted from the second section of the ambient air line or via the second bypass line, while circumventing the second section of the ambient air line, from the first section of the ambient air line or the first bypass line, into the third section of the ambient air line.

The third section of the ambient air line may be thermally coupled to the refrigerant circuit of the refrigerating machine, under which circumstances the thermal coupling between the third section of the ambient air line and the refrigerant circuit may be brought about, for example, via the heat exchanger arranged in the refrigerant circuit. The cooling of the ambient air in the ambient air line by the transmission of heat to the refrigerant circulating in the refrigerant circuit of the refrigerating machine then takes place when it flows through the third section of the ambient air line.

Finally, the control apparatus of the aircraft air conditioning system may be configured to control the flow of ambient air through the ambient air line in such a way that the ambient air is then conducted alternatively through either a fourth section of the ambient air line, or through a third bypass line. The fourth section of the ambient air line may be arranged downstream of the third section of the ambient air line, referred to the direction of flow of the ambient air through the ambient air line. There is preferably arranged, in the fourth section of the ambient air line, a turbine for depressurizing the ambient air flowing through the fourth section of the ambient air line. The third bypass line may run parallel to the fourth section of the ambient air line. Ambient air which flows through the third bypass line is then conducted past the fourth section of the ambient air line and consequently past the turbine.

In interaction with an ambient air compressor, the turbine arranged in the fourth section of the ambient air line makes it possible to carry out a cold air process in which the ambient air flowing through the ambient air line is initially compressed and then depressurized again and, in the process, cooled down to a desired low temperature before it is fed into the mixer of the aircraft air conditioning system. The turbine may be arranged on a common shaft with the second ambient air compressor arranged in the second section of the ambient air line.

In the aircraft air conditioning system, it is accordingly possible, as required, to either use exclusively the cooling process which is taking place in the refrigerating machine or both the cooling process which is taking place in the refrigerating machine and the cold air process which is carried out by an ambient air compressor and the turbine, for processing and cooling the ambient air flowing through the ambient air line. Operation of the aircraft air conditioning system while exclusively using the cooling process which is taking place in the refrigerating machine is suitable, particularly in operating phases of the aircraft air conditioning system in which the ambient air flowing through the ambient air line has only a low moisture content. This is the case, for example, when an aircraft equipped with the aircraft air conditioning system is being operated in cruising flight. It is then possible, by pre-compressing the ambient air flowing through the ambient air line by means of one of the ambient air compressors before the air is cooled to a desired temperature by the transmission of heat to the refrigerant circulating in the refrigerant circuit of the refrigerating machine, to also control, as required, the efficiency of the cooling process which is taking place in the refrigerating machine.

Operation of the aircraft air conditioning system while using both the cooling process which is taking place in the refrigerating machine and the cold air process is particularly appropriate if the ambient air flowing through the ambient air line must first be dehumidified before it is fed into the mixer of the aircraft air conditioning system. This is the case, for example, when an aircraft equipped with the aircraft air conditioning system is being operated on the ground and when it is in ascending or descending flight.

Finally, it is also possible, by switching off the refrigerating machine, to operate the aircraft air conditioning system while exclusively using the cold air process. This is appropriate when the aircraft cabin is to be heated by means of the aircraft air conditioning system. Operation of the aircraft air conditioning system while exclusively using the cold air process is also possible as an emergency operation in the event of failure of the refrigerating machine. In an emergency operation of this kind, both the ambient air compressors may be for compressing the ambient air flowing through the ambient air line, as a result of which it is possible to supply the aircraft cabin with a sufficient quantity of processed and cooled ambient air, even if, in an aircraft air conditioning system equipped with two air conditioning units, one air conditioning unit fails completely and, in addition, the refrigerating machine of the second air conditioning unit is no longer capable of functioning.

The operation of the aircraft air conditioning system can thus be adapted, in various operating phases of the aircraft air conditioning system, to the air conditioning requirements imposed upon the aircraft air conditioning system in the various operating phases. The aircraft air conditioning system can therefore be operated in a particularly flexible and energy-efficient manner.

If the aircraft air conditioning system comprises at least one electric motor for driving the first and/or the second ambient air compressor and/or the refrigerant compressor arranged in the refrigerant circuit of the refrigerating machine, it is possible to dispense with bleed air taken from an engine or an auxiliary engine of the aircraft, not only when preparing air conditioning air but also when driving at least one ambient air compressor and/or the refrigerant compressor. As a result, the fuel consumption of the engine or auxiliary engine is reduced. Moreover, the use of an electric drive for at least one of the ambient air compressors and/or the refrigerant compressor, and the use of ambient air for preparing air conditioning air, permit complete decoupling of the energy feed and fresh air feed to the aircraft air conditioning system. As a result, the energy feed and the fresh air feed can be optimized independently of one another and adapted, for example, to the operating conditions of the aircraft air conditioning system. The aircraft air conditioning system can then be operated in a particularly energy-efficient manner.

The control apparatus of the aircraft air conditioning system is preferably configured to control the first ambient air compressor in such a way that it compresses the ambient air which is flowing through the first section of the ambient air line and which may have, when an aircraft equipped with the aircraft air conditioning system is in flight, a pressure that lies well below the atmospheric pressure at sea level, to a pressure which substantially corresponds only to a set cabin pressure in an aircraft cabin which is to be air conditioned. The first ambient air compressor can therefore be operated in a very energy-efficient manner.

The control apparatus of the aircraft air conditioning system is preferably also configured to control the second ambient air compressor in such a way that it compresses the ambient air flowing through the second section of the ambient air line to a pressure which is greater than the set cabin pressure in the aircraft cabin which is to be air conditioned. If the second ambient air compressor compresses the ambient air flowing through the ambient air line to a pressure which is greater than the set cabin pressure in the aircraft cabin which is to be air conditioned, an effective and efficient cold air process can be carried out by the second ambient air compressor and the turbine which is arranged in the fourth section of the ambient air line.

A water separating device, preferably an efficient high-pressure water separator, may also be arranged in the fourth section of the ambient air line. As a result of the compression, in the second ambient air compressor, of the ambient air to a pressure that lies above the set cabin pressure, it is made possible for excess water to be removed, in the water separator arranged in the fourth section of the ambient air line, from the flow of ambient air.

The water separating device, which is arranged in the fourth section of the ambient air line, preferably upstream of the turbine, referred to the direction of flow of the ambient air through the ambient air line, may comprise a water separator. On flowing through the water separator, the ambient air is dehumidified to an extent such as to ensure that not too much moisture is fed to the aircraft cabin which is to be air conditioned. In the water separator, water separated out of the ambient air flowing through the fourth section of the ambient air line may be injected, via a water injection device, into a ram air duct. The water, which partially evaporates therein, cools the ram air and increases the energy-efficiency of the aircraft air conditioning system.

The water separating device may also comprise a reheater, which is arranged downstream of the water separator, referred to the direction of flow of the ambient air through the ambient air line, for heating the ambient air flowing through the fourth section of the ambient air line before it is fed into the turbine. The reheater may bring about thermal coupling between the fourth section of the ambient air line and the second section of the ambient air line. In particular, the reheater may bring warm ambient air flowing through the second section of the ambient air line, after it has been compressed in the second ambient air compressor, into thermal contact with the ambient air flowing through the fourth section of the ambient air line, before it is fed into the turbine. In the reheater, droplets of water which have remained in the flow of ambient air after flowing through the water separator are evaporated in order to protect the turbine against damage as a result of droplet impact or cavitation. Furthermore, the reheater increases the power output of the turbine.

Even if the second ambient air compressor compresses the ambient air flowing through the second section of the ambient air line to a pressure which is greater than the set cabin pressure in the aircraft cabin which is to be air conditioned, the operation of the first and second ambient air compressors is nevertheless preferably controlled in such a way that the temperature of the compressed ambient air does not exceed a maximum temperature of, for example, 160° C. As a result, it is possible to dispense with insulation and ventilation of an installation space which is provided in an aircraft for the aircraft air conditioning system. This permits weight and cost savings.

The control apparatus is in particular configured to control the flow of ambient air through the ambient air line in such a way that, when an aircraft equipped with the aircraft air conditioning system is operated on the ground, the ambient air is initially conducted through the first bypass line, then through the second section of the ambient air line, then through the third section of the ambient air line and finally through the fourth section of the ambient air line. When an aircraft equipped with the aircraft air conditioning system is operated on the ground, the ambient air can thus be compressed, on flowing through the second ambient air compressor arranged in the second section of the ambient air line, to a pressure which lies above the set cabin pressure and which permits dehumidification of the ambient air in the water separating device provided in the fourth section of the ambient air line. On the other hand, the first ambient air compressor arranged in the first section of the ambient air line is circumvented. Cooling of the ambient air takes place both by the transmission of heat to the refrigerant circuit of the refrigerating machine and by the depressurizing of the ambient air in the turbine arranged in the fourth section of the ambient air line.

The control apparatus is preferably also configured to control the flow of ambient air through the ambient air line in such a way that, when an aircraft equipped with the aircraft air conditioning system is climbing or descending, the ambient air is initially conducted through the first section of the ambient air line, then through the second section of the ambient air line, then through the third section of the ambient air line and finally through the fourth section of the ambient air line. When an aircraft equipped with the aircraft air conditioning system is climbing or descending, the first ambient air compressor arranged in the first section of the ambient air line and the second ambient air compressor arranged in the second section of the ambient air line are therefore connected in series in order to compress the ambient air flowing through the ambient air line to a pressure which permits dehumidification of the ambient air in the water separating device provided in the fourth section of the ambient air line, even if the efficiency of the water separator declines.

As a result of the series connection of the ambient air compressors, both the ambient air compressors can be operated within their optimum range of performance characteristics, even in the case of high output requirements. Cooling of the ambient air takes place, as when operating on the ground, both by the transmission of heat to the refrigerant circuit of the refrigerating machine and by the depressurizing of the ambient air in the turbine arranged in the fourth section of the ambient air line.

Finally, the control apparatus may be configured to control the flow of ambient air through the ambient air line in such a way that, when an aircraft equipped with the aircraft air conditioning system is operated in cruising flight, the ambient air is initially conducted through the first section of the ambient air line, then through the second bypass line, then through the third section of the ambient air line and finally through the third bypass line. When an aircraft equipped with the aircraft air conditioning system is operated in cruising flight, the ambient air flowing through the ambient air line is thus compressed to the set cabin pressure exclusively by the first ambient air compressor arranged in the first section of the ambient air line, since dehumidification of the ambient air, which is very dry when an aircraft is at cruising height, is not necessary. The second ambient air compressor arranged in the second section of the ambient air line is accordingly circumvented in just the same way as the water separating device provided in the fourth section of the ambient air line and the turbine which is likewise provided in the fourth section of the ambient air line. Cooling of the ambient air takes place exclusively by the transmission of heat to the refrigerant circuit of the refrigerating machine.

There may be arranged, in the first section of the ambient air line, a first valve which may be configured to control the flow of ambient air through the first section of the ambient air line. There may also be arranged, in the first section of the ambient air line, a first pre-cooler for pre-cooling ambient air which has been compressed by the first ambient air compressor. The first pre-cooler is preferably arranged in a ram air duct and can have ram air conducted by the ram air duct flowing through it. In the first pre-cooler, the ambient air which has been heated up by compression in the first ambient air compressor is cooled down again to a desired lower temperature. There is preferably arranged, in the first bypass line, a second valve which is configured to control the flow of ambient air through the first bypass line. By suitably controlling the first valve which is arranged in the first section of the ambient air line, and the second valve which is arranged in the first bypass line, it is possible to route the ambient air either through the first section of the ambient air line, or alternatively through the first bypass line, as required.

In the second section of the ambient air line, there may be arranged a third valve which is configured to control the flow of ambient air through the second section of the ambient air line. There is preferably arranged, in the second bypass line, a fourth valve which is configured to control the flow of ambient air through the second bypass line. By suitably controlling the third valve which is arranged in the second section of the ambient air line, and the fourth valve which is arranged in the second bypass line, it is possible to route the ambient air, as required, in a manner distributed to the second section of the ambient air line and to the second bypass line, but in particular either through the second section of the ambient air line, or alternatively through the second bypass line.

There is preferably arranged, in the third section of the ambient air line, a second pre-cooler for pre-cooling ambient air before the thermal coupling between the third section of the ambient air line and the refrigerant circuit of the refrigerating machine is brought about. The second pre-cooler is preferably arranged in a ram air duct and can have ram air conducted through the ram air duct flowing through it. For example, the first pre-cooler and the second pre-cooler may be arranged in a common ram air duct, under which circumstances the first pre-cooler is then preferably positioned, within the ram air duct, downstream of the second pre-cooler, referred to the direction of flow of the ram air through the ram air duct.

The condenser of the refrigerating machine may also be arranged in a ram air duct. The condenser of the refrigerating machine, the first pre-cooler and the second pre-cooler are preferably arranged in a common ram air duct. The aircraft air conditioning system then only has to have one ram air duct. The condenser of the refrigerating machine is preferably positioned, within the ram air duct, upstream of the second pre-cooler, referred to the direction of flow of the ram air through the ram air duct. As a result, adequate cooling of the condenser by the ram air flowing through the ram air duct is guaranteed in all the operating phases of the aircraft air conditioning system. In order to ensure that ram air flows through the ram air duct in a correct manner, even when an aircraft equipped with the aircraft air conditioning system is being operated on the ground, a blower may also be arranged in the ram air duct for conveying ram air through the ram air duct. The blower is preferably driven by a fourth electric motor.

A trim air line preferably branches off from the third section of the ambient air line. The point at which the trim air line branches off from the third section of the ambient air line preferably lies, referred to the direction of flow of the ambient air through the ambient air line, upstream of the thermal coupling of the third section of the ambient air line to the refrigerant circuit of the refrigerating machine, and preferably also upstream of the second pre-cooler. This ensures that the trim air is taken out at a point in the third section of the ambient air line at which the ambient air flowing through the third section of the ambient air line is at the maximum temperature. The flow of trim air through the trim air line can be controlled by a trim air valve arranged in the trim air line.

Finally, there may be arranged, in the fourth section of the ambient air line, a fifth valve which may be configured to control the flow of ambient air through the fourth section of the ambient air line. There is preferably arranged, in the third bypass line, a sixth valve which is configured to control the flow of ambient air through the third bypass line. By suitably controlling the fifth valve, which is arranged in the fourth section of the ambient air line, and the sixth valve, which is arranged in the third bypass line, it is possible to route the ambient air, as required, in a manner distributed to the fourth section of the ambient air line and to the third bypass line, but in particular, either through the fourth section of the ambient air line, or alternatively through the third bypass line.

In a method for operating an aircraft air conditioning system, ambient air is conducted through an ambient air line which is connected to a mixer of the aircraft air conditioning system, in order to feed ambient air to the mixer. Recirculation air is also conducted through a recirculation air line which is connected to the mixer of the aircraft air conditioning system, in order to feed to the mixer recirculation air which has been discharged from an aircraft area to be air conditioned. A refrigerant circuit of a refrigerating machine is thermally coupled to the ambient air line and to the recirculation air line, in order to transmit, before the ambient air and the recirculation air are fed into the mixer, heat from the ambient air flowing through the ambient air line and from the recirculation air flowing through the recirculation air line, to the refrigerant circulating in the refrigerant circuit.

The refrigerant circulating in the refrigerant circuit of the refrigerating machine is preferably a two-phase refrigerant. A refrigerant compressor may be arranged in the refrigerant circuit of the refrigerating machine. The refrigerant compressor is preferably driven by a first electric motor. There may also be arranged, in the refrigerant circuit of the refrigerating machine, a condenser, a refrigerant collector, an expansion valve and/or a heat exchanger, in particular an evaporator, which thermally couples the refrigerant circuit to the ambient air line.

The refrigerant circuit of the refrigerating machine may be thermally coupled to the recirculation air line via a further heat exchanger which is preferably constructed in the form of a further evaporator. The further heat exchanger is preferably arranged in a connecting line which may branch off from the refrigerant circuit of the refrigerating machine upstream of the heat exchanger which thermally couples the refrigerant circuit to the ambient air line and may open back into the refrigerant circuit of the refrigerating machine downstream of the heat exchanger which thermally couples the refrigerant circuit to the ambient air line. The terms "upstream" and "downstream" here refer to the direction of flow of the refrigerant through the refrigerant circuit. In particular, the connection line may branch off from the refrigerant collector arranged in the refrigerant circuit. There may be arranged, in the connecting line, a control valve which is configured to control the flow of refrigerant through the connecting line. A further expansion valve may also be arranged in the connecting line.

The flow of ambient air through the ambient air line is preferably controlled in such a way that the ambient air is conducted firstly alternatively through either a first section of the ambient air line, in which first section there is arranged a first ambient air compressor, which is driven, in particular, by a second electric motor, for compressing the ambient air flowing through the first section of the ambient air line, or through a first bypass line which runs parallel to the first section of the ambient air line; the ambient air is then conducted alternatively through either a second section of the ambient air line, in which second section there is arranged a second ambient air compressor, which is driven, in particular, by a third electric motor, for compressing the ambient air flowing through the second section of the ambient air line, or through a second bypass line which runs parallel to the second section of the ambient air line; the ambient air is then conducted through a third section of the ambient air line, which third section is thermally coupled to the refrigerant circuit of the refrigerating machine; and the ambient air is then conducted alternatively through either a fourth section of the ambient air line, in which fourth section there is arranged a turbine for depressurizing the ambient air flowing through the fourth section of the ambient air line, or through a third bypass line which runs parallel to the fourth section of the ambient air line.

The first ambient air compressor is preferably controlled in such a way that it compresses the ambient air which is flowing through the first section of the ambient air line and which may have, when an aircraft equipped with the aircraft air conditioning system is in flight, a pressure that lies significantly below the atmospheric pressure at sea level, to a pressure which substantially corresponds to a set cabin pressure in an aircraft cabin which is to be air conditioned. The second ambient air compressor may be controlled in such a way that it compresses the ambient air flowing through the second section of the ambient air line to a pressure which is greater than the set cabin pressure in the aircraft cabin which is to be air conditioned. Water may also be separated out of the ambient air flowing through the fourth section of the ambient air line.

In particular, the flow of ambient air through the ambient air line may be controlled in such a way that, when an aircraft equipped with the aircraft air conditioning system is operated on the ground, the ambient air is initially conducted through the first bypass line, then through the second section of the ambient air line, then through the third section of the ambient air line and finally through the fourth section of the ambient air line. When an aircraft equipped with the aircraft air conditioning system is climbing or descending flight, the flow of ambient air through the ambient air line is preferably controlled in such a way that the ambient air is initially conducted through the first section of the ambient air line, then through the second section of the ambient air line, then through the third section of the ambient air line and finally through the fourth section of the ambient air line. When an aircraft equipped with the aircraft air conditioning system is operated in cruising flight, the flow of ambient air through the ambient air line is preferably controlled in such a way that the ambient air is initially conducted through the first section of the ambient air line, then through the second bypass line, then through the third section of the ambient air line and finally through the third bypass line.

The flow of ambient air through the first section of the ambient air line is preferably controlled by a first valve which is arranged in the first section of the ambient air line. Ambient air which has been compressed by the first ambient air compressor may be pre-cooled by a first pre-cooler arranged in the first section of the ambient air line. The flow of ambient air through the first bypass line may be controlled by a second valve arranged in the first bypass line. The flow of ambient air through the second section of the ambient air line may be controlled by a third valve arranged in the second section of the ambient air line. The flow of ambient air through the second bypass line may be controlled by a fourth valve arranged in the second bypass line. The ambient air may be pre-cooled, before the thermal coupling between the third section of the ambient air line and the refrigerant circuit is brought about, by a second pre-cooler arranged in the third section of the ambient air line. Trim air may be branched off, through a trim air line that branches off from the third section of the ambient air line, from the ambient air flowing through the third section of the ambient air line. The flow of ambient air through the fourth section of the ambient air line may be controlled by a fifth valve arranged in the fourth section of the ambient air line. The flow of ambient air through the third bypass line may be controlled by a sixth valve arranged in the third bypass line.

BRIEF DESCRIPTION OF THE DRAWINGS

A preferred embodiment of the invention will now be explained in greater detail with reference to the appended schematic drawing, in which The FIGURE shows an air conditioning installation for air conditioning an aircraft cabin.

DETAILED DESCRIPTION OF THE PREFERRED EMBODIMENTS

An aircraft air conditioning system 10, which is illustrated in the FIGURE, comprises an ambient air line 12 through which ambient air can flow and which is connected to a mixer 14 of the aircraft air conditioning system 10 in order to feed the ambient air taken from an aircraft's surroundings 15 to the mixer 14. In the mixer 14, the ambient air from the ambient air line 12 is mixed with recirculation air which has been discharged from an aircraft cabin. The mixed air produced in the mixer 14 is finally used for air conditioning the aircraft cabin.

The aircraft air conditioning system 10 is equipped with a refrigerating machine 16 which comprises a refrigerant circuit 18, through which a two-phase refrigerant, for example R134A ($CH_2F-CF_3$), $CO_2$ or R-245fa (1,1,1,3,3-pentafluoropropane) flows, and also comprises a refrigerant compressor 20 which is arranged in the refrigerant circuit 18. The refrigerant compressor 20 is driven by a first electric motor 22. The refrigerant circuit 18 is thermally coupled to the ambient air line in order to transmit heat from the ambient air flowing through the ambient air line 12 to the refrigerant circulating in the refrigerant circuit 18, before the ambient air is fed into the mixer 14. There are arranged in the refrigerant circuit 18, in addition to the refrigerant compressor 20, a condenser 24, a refrigerant collector 26, an expansion valve 28 and a heat exchanger 30, in particular an evaporator, which thermally couples the refrigerant circuit 18 to the ambient air line 12.

The refrigerant circuit 18 of the refrigerating machine 16 is also thermally coupled to a recirculation air line 32, through which recirculation air flows and which is connected to the mixer 14 of the aircraft air conditioning system 10, in order to transmit heat from the recirculation air flowing through the recirculation air line 32 to the refrigerant flowing through the refrigerant circuit 18. The thermal coupling between the refrigerant circuit 18 and the recirculation air line 32 is established by a further heat exchanger 34, in particular an evaporator, which is arranged in a connecting line 36 which branches off from the refrigerant collector 26 arranged in the refrigerant circuit 18. The flow of refrigerant through the connecting line 36 is controlled by a control valve 38 arranged in the connecting line 36. A further expansion valve 40 is also arranged in the connecting line 36, upstream of the further heat exchanger 34, referred to the direction of flow of the refrigerant through the refrigerant circuit 18. By means of the further expansion valve 40, it is possible to set the pressure and temperature of the refrigerant flowing through the connecting line 36, as desired, before the refrigerant is conducted into the further heat exchanger 34.

In the aircraft air conditioning system 10, therefore, the refrigerating machine 16 is used not only for cooling the ambient air flowing through the ambient air line 12, but also for cooling recirculation air which has been discharged from the aircraft cabin which is to be air conditioned. The recirculation air can therefore be cooled, before it is fed into the mixer 14 of the aircraft air conditioning system 10, to the same low temperature as the ambient air flowing through the ambient air line 12. Consequently it is possible to dispense with cooling down the ambient air, by transmitting heat to the refrigerant circulating in the refrigerant circuit 18 of the refrigerating machine 16, to a temperature which lies below a desired set cabin feed air temperature. Furthermore, operation of the refrigerating machine 16 at relatively high minimum refrigerant temperatures is made possible.

The ambient air line 12 comprises a first section 12a, in which a first ambient air compressor 42 for compressing the ambient air flowing through the first section 12a of the ambient air line 12 is arranged. The first ambient air compressor 42, which is regulated in its rotational speed, is driven by a second electric motor 44. The first ambient air compressor is controlled by a control apparatus 46 of the aircraft air conditioning system 10 in such a way that it compresses the ambient air flowing through the first section 12a of the ambient air line 12 to the set cabin pressure in the aircraft cabin which is to be air conditioned. Also arranged in the first section 12a of the ambient air line 12 is a first valve 48 for controlling the flow of ambient air through the first section 12a of the ambient air line 12.

A first pre-cooler 50 for pre-cooling the ambient air which has been compressed by the first ambient air compressor 42 is also arranged in the first section 12a of the ambient air line 12. The first pre-cooler 50 is arranged in a ram air duct 52 and has ram air, which is conducted through the ram air duct 52, flowing through it when the aircraft air conditioning system 10 is in operation. In the first pre-cooler 50, the ambient air which has been warmed up by being compressed in the first ambient air compressor 42 is cooled to a desired lower temperature again.

A first bypass line 54 runs parallel to the first section 12a of the ambient air line 12. A second valve 56, which is arranged in the first bypass line 54, serves to control the flow of ambient air through the first bypass line 54. Ambient air which flows through the first bypass line 54 is conducted past the first section 12a of the ambient air line 12 and consequently past the first ambient air compressor 42 and the first pre-cooler 50.

The ambient air line 12 also comprises a second section 12b which is arranged downstream of the first section 12a of the ambient air line 12 and downstream of the first bypass line 54, referred to the direction of flow of the ambient air through the ambient air line 12. The ambient air fed to the second section 12b of the ambient air line 12 can consequently be conducted from the first section 12a of the ambient air line 12 or from the first bypass line 54 into the second section 12b of the ambient air line 12. Arranged in the second section 12b of the ambient air line 12 is a second ambient air compressor 58 for compressing the ambient air flowing through the second section 12b of the ambient air line 12, under which circumstances ambient air which has been pre-compressed by the first ambient air compressor 42 or untreated ambient air from the first bypass line 54 can be fed to the second ambient air compressor 58. The second ambient air compressor 58, which is regulated in its rotational speed, is driven by a third electric motor 60.

The second ambient air compressor 58 is controlled by the control apparatus 46 of the aircraft air conditioning system 10 in such a way that it compresses the ambient air flowing through the second section 12b of the ambient air line 12 to a pressure which is greater than the set cabin pressure in the aircraft cabin which is to be air conditioned. However, the operation of the first and second ambient air compressors 42, 58 is controlled in such a way that the temperature of the compressed ambient air does not exceed a maximum temperature of, for example, 160 C°. A third valve 62 which is arranged in the second section 12b of the ambient air line 12 serves to control the flow of ambient air through the second section 12b of the ambient air line 12.

The aircraft air conditioning system 10 also comprises a second bypass line 64 which runs parallel to the second section 12b of the ambient air line 12. Arranged in the second bypass line 64 is a fourth valve 66 which controls the flow of ambient air through the second bypass line 64. Ambient air which flows through the second bypass line 64 is conducted past the second section 12b of the ambient air line 12 and consequently past the second ambient air compressor 58.

The ambient air line 12 also comprises a third section 12c which is arranged downstream of the second section 12b of the ambient air line and downstream of the second bypass line 64, referred to the direction of flow of the ambient air through the ambient air line 12. The ambient air fed to the third section 12c of the ambient air line 12 can consequently be conducted from the second section 12b of the ambient air line 12 or via the second bypass line 64, while circumventing the second section 12b of the ambient air line 12, from the first section 12a of the ambient air line 12 into the third section 12c of the ambient air line 12. The third section 12c of the ambient air line 12 is thermally coupled to the refrigerant circuit 18 of the refrigerating machine 16 via the heat exchanger 30 arranged in the refrigerant circuit 18. The cooling of the ambient air in the ambient air line 12 by the transmission of heat to the refrigerant circulating in the refrigerant circuit 18 of the refrigerating machine 16 accordingly takes place when it flows through the third section 12c of the ambient air line 12.

Arranged in the third section 12c of the ambient air line 12 is a second pre-cooler 68 for pre-cooling ambient air before the thermal coupling between the third section 12c of the ambient air line 12 and the refrigerant circuit 18 of the refrigerating machine 16 is brought about. The second pre-cooler 68 is arranged in the ram air duct 52 upstream of the first pre-cooler 50, referred to the direction of flow of the ram air through the ram air duct and, in a manner similar to the first pre-cooler 50, has ram air which is conducted through the ram air duct 52 flowing through it when the aircraft air conditioning system 10 is in operation.

Also arranged in the ram air duct 52, in addition to the first and second pre-coolers 50, 68, is the condenser 24 of the refrigerating machine 16, the condenser 24 being positioned in the ram air duct 52 upstream of the second pre-cooler 68, referred to the direction of flow of the ram air through the ram air duct 52. In order to ensure that ram air flows through the ram air duct 52 in a correct manner, even when an aircraft equipped with the aircraft air conditioning system 10 is being operated on the ground, a blower 70 is also arranged in the ram air duct 52 for conveying ram air through the ram air duct 52. The blower 70 is driven by a fourth electric motor 72.

A trim air line 74 branches off from the third section 12c of the ambient air line 12 upstream of the second pre-cooler 68, referred to the direction of flow of the ambient air through the ambient air line 12. The flow of trim air through the trim air line 74 is controlled by a trim air valve 76 arranged in the trim air line 74.

The ambient air line 12 of the aircraft air conditioning system 10 also comprises a fourth section 12d which is arranged downstream of the third section 12c of the ambient air line 12, referred to the direction of flow of the ambient air through the ambient air line 12. Arranged in the fourth section 12d of the ambient air line 12 is a water separating device 78 which comprises a water separator 80 and also a reheater 82. On flowing through the water separator 80, the ambient air is dehumidified to an extent such as to ensure that not too much moisture is fed to the aircraft cabin which is to be air conditioned. In the water separator 80, water which is separated out of the ambient air is conducted, via a drainage line 84, into the ram air duct 52 and is injected into the ram air duct 52 via a water injection nozzle 87. In the process, the water partially evaporates and cools the ram air flowing through the ram air duct 52.

Also arranged in the fourth section 12d of the ambient air line 12 is a turbine 86 for depressurizing the ambient air flowing through the fourth section 12d of the ambient air line 12. The turbine 86 is arranged on a common shaft with the second ambient air compressor 58, which is arranged in the second section 12b of the ambient air line 12. The reheater 82, which is arranged downstream of the water separator 80, referred to the direction of flow of the ambient air through the ambient air line 12, serves to heat the ambient air flowing through the fourth section 12d of the ambient air line 12 before it is fed into the turbine 86, and the reheater brings about a thermal coupling between the fourth section 12d of the ambient air line 12 and the second section 12b of the ambient air line 12. As a result, the reheater 82 brings warm ambient air flowing through the second section 12b of the ambient air line 12, after it has been compressed in the second ambient air compressor 58, into thermal contact with the ambient air flowing through the fourth section 12d of the ambient air line 12, before it is fed into the turbine 86. In the reheater 82, droplets of water which have remained in the flow of ambient air after passing through the water separator 80 are evaporated in order to protect the turbine 86 against damage as a result of droplet impact or cavitation. Furthermore, the reheater 82 increases the power output of the turbine 86.

Finally, a fifth valve 88 is arranged in the fourth section 12d of the ambient air line 12 for controlling the flow of ambient air through the fourth section 12d of the ambient air line 12.

The aircraft air conditioning system 10 also comprises a third bypass line 90 which runs parallel to the fourth section 12d of the ambient air line 12. A sixth valve 92 is arranged in the third bypass line 90 for controlling the flow of ambient air through the third bypass line 90. Ambient air which flows through the third bypass line 90 is conducted past the fourth section 12d of the ambient air line 12 and consequently past the water separating device 78 and the turbine 86.

In interaction with an ambient air compressor 42, 58, in particular the second ambient air compressor 58, which compresses the ambient air flowing through the second section 12b of the ambient air line 12 to a pressure which is greater than the set cabin pressure in the aircraft cabin which is to be air conditioned, the turbine 86 arranged in the fourth section 12d of the ambient air line 12 makes it possible to carry out a cold air process in which the ambient air flowing through the ambient air line 12 is initially compressed and then depressurized again and, in the process, cooled down. The compression of the ambient air to a pressure that lies above the set cabin pressure, makes it possible for excess water to be removed, in the water separating device 78 arranged in the fourth section 12d of the ambient air line 12, from the flow of ambient air. As a result of the depressurization of the ambient air in the turbine 86, the ambient air is cooled down to a desired low temperature before it is fed into the mixer of the aircraft air conditioning system.

In the aircraft air conditioning system, it is accordingly possible, as required, to either use exclusively the cold vapor process which is taking place in the refrigerating machine 16 or both the cold vapor process and the cold air process, for processing and cooling the ambient air flowing through the ambient air line 12. Operation of the aircraft air conditioning system, while exclusively using the cold vapor process, is particularly suitable in operating phases of the aircraft air conditioning system 10 in which the ambient air flowing through the ambient air line has only a low moisture content. Operation of the aircraft air conditioning system 10 while using both the cold vapor process and the cold air process is particularly appropriate if the ambient air flowing through the ambient air line 12 must first be dehumidified before it is fed into the mixer 14 of the aircraft air conditioning system 10.

Finally, it is also possible, by switching off the refrigerating machine 16, to operate the aircraft air conditioning system 10 while exclusively using the cold air process. This is appropriate when the aircraft cabin is to be heated by means of the aircraft air conditioning system 10. Operation of the aircraft air conditioning system 10 while exclusively using the cold air process is also possible as an emergency operation in the event of failure of the refrigerating machine 16. In an emergency operation of this kind, both the ambient air compressors 42, 58 may be used for compressing the ambient air flowing through the ambient air line 12, as a result of which it becomes possible to supply the aircraft cabin with a sufficient quantity of processed and cooled ambient air, even if, in an aircraft air conditioning system 10 equipped with two air conditioning units, one air conditioning unit fails completely and, in addition, the refrigerating machine of the second air conditioning unit is no longer capable of functioning.

The control apparatus 46 controls the flow of ambient air through the ambient air line 12 by suitably controlling the valves 48, 56, 62, 66, 88, 92 in such a way that the ambient air is initially conducted through the first section 12a of the ambient air line 12 or alternatively the first bypass line 54; the ambient air is then conducted through the second section 12b of the ambient air line 12 or alternatively the second bypass line 64; the ambient air is then conducted through a third section 12c of the ambient air line 12; and the ambient air is then conducted through the fourth section 12d of the ambient air line 12 or alternatively the third bypass line 90.

In particular, the control apparatus 46 controls the operation of the aircraft air conditioning system 10 and the flow of ambient air through the ambient air line 12 in such a way that, when an aircraft equipped with the aircraft air conditioning system 10 is being operated on the ground, the ambient air is initially conducted through the first bypass line 54, then through the second section 12b of the ambient air line 12, then through the third section 12c of the ambient air line 12 and finally through the fourth section 12d of the ambient air line 12. When an aircraft equipped with the aircraft air conditioning system 10 is being operated on the ground, the ambient air is thus compressed, on flowing through the second ambient air compressor 58, to a pressure which lies above the set cabin pressure and which permits dehumidification of the ambient air in the water separating device 78. On the other hand, the first ambient air compressor 42 is circumvented. Cooling of the ambient air takes place both by the transmission of heat to the refrigerant circuit 18 of the refrigerating machine 16 and by the depressurization of the ambient air in the turbine 86.

When, on the other hand, an aircraft equipped with the aircraft air conditioning system 10 is being operated in ascending or descending flight, the control apparatus 46 controls the flow of ambient air through the ambient air line 12 in such a way that the ambient air is initially conducted through the first section 12a of the ambient air line 12, then through the second section 12b of the ambient air line 12, then through the third section 12c of the ambient air line 12 and finally through the fourth section 12d of the ambient air line 12. When an aircraft equipped with the aircraft air conditioning system 10 is being operated in ascending or descending flight, the first ambient air compressor 42 and the second ambient air compressor 58 are therefore connected in series in order to compress the ambient air flowing through the ambient air line 12 to a pressure which permits dehumidification of the ambient air in the water separating device 78, even if the efficiency of the water separator 80 declines. As a result of the series connection of the ambient air compressors 42, 58, both the ambient air compressors 42, 58 can be operated within their optimum range of performance characteristics, even in the case of high power requirements. Cooling of the ambient air takes place, as when operating on the ground, both by the transmission of heat to the refrigerant circuit 18 of the refrigerating machine 16 and by the depressurization of the ambient air in the turbine 86.

Finally, when an aircraft equipped with the aircraft air conditioning system 10 is being operated in cruising flight, the control apparatus 46 controls the flow of ambient air through the ambient air line 12 in such a way that the ambient air is initially conducted through the first section 12a of the ambient air line 12, then through the second bypass line 64, then through the third section 12c of the ambient air line 12 and finally through the third bypass line 90. When an aircraft equipped with the aircraft air conditioning system 10 is being operated in cruising flight, the ambient air flowing through the ambient air line 12 is thus compressed to the set cabin pressure exclusively by the first ambient air compressor 42, since dehumidification of the ambient air, which is very dry when an aircraft is at cruising height, is not necessary. The second ambient air compressor 58 is accordingly circumvented in just the same way as the water separating device 78 and the turbine 86. Cooling of the ambient air takes place exclusively by the transmission of heat to the refrigerant circuit 18 of the refrigerating machine 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system comprising:
an ambient air line configured to have ambient air flow therethrough and which is connected to a mixer of the aircraft air conditioning system to feed ambient air to the mixer;
a recirculation air line configured to have recirculation air flow therethrough and which is connected to the mixer of the aircraft air conditioning system to feed to the mixer recirculation air which has been discharged from an aircraft area to be air conditioned; and
a refrigerating machine which comprises a refrigerant circuit which is configured to have a refrigerant flow therethrough, wherein the refrigerant circuit is thermally coupled to the ambient air line and to the recirculation air line to transmit heat from the ambient air flowing through the ambient air line and from the recirculation air flowing through the recirculation air line to the refrigerant circulating in the refrigerant circuit, before the ambient air and the recirculation air are fed into the mixer,
a controller configured to control the flow of ambient air through the ambient air line such that:
the ambient air is conducted firstly alternatively through either a first section of the ambient air line, in which first section there is arranged a first ambient air compressor, which is driven by a second electric motor, for compressing the ambient air flowing through the first section of the ambient air line, or through a first bypass line which runs parallel to the first section of the ambient air line;
the ambient air is then conducted alternatively through either a second section of the ambient air line, in which second section there is arranged a second ambient air compressor, which is driven by a third electric motor, for compressing the ambient air flowing through the second section of the ambient air line, or through a second bypass line which runs parallel to the second section of the ambient air line;
the ambient air is then conducted through a third section of the ambient air line, which third section is thermally coupled to the refrigerant circuit of the refrigerating machine; and
the ambient air is then conducted alternatively through either a fourth section of the ambient air line, in which fourth section there is arranged a turbine for depressurizing the ambient air flowing through the fourth section of the ambient air line, or through a third bypass line which runs parallel to the fourth section of the ambient air line.

2. The aircraft air conditioning system according to claim 1, wherein at least one of:
the controller is configured to control the first ambient air compressor in such a way that first ambient air compressor compresses the ambient air flowing through the first section of the ambient air line to a pressure which substantially corresponds to a set cabin pressure in an aircraft cabin which is to be air conditioned,
the controller is configured to control the second ambient air compressor in such a way that it compresses the ambient air flowing through the second section of the ambient air line to a pressure which is greater than the set cabin pressure in the aircraft cabin which is to be air conditioned, or a water separator is arranged in the fourth section of the ambient air line.

3. The aircraft air conditioning system according to claim 1, wherein at least one of
the controller is configured to control the flow of ambient air through the ambient air line such that, when an aircraft equipped with the aircraft air conditioning system is operated on the ground, the ambient air is initially conducted through the first bypass line, then through the second section of the ambient air line, then through the third section of the ambient air line and finally through the fourth section of the ambient air line;
when an aircraft equipped with the aircraft air conditioning system is climbing or descending, the ambient air is initially conducted through the first section of the ambient air line, then through the second section of the ambient air line, then through the third section of the ambient air line and finally through the fourth section of the ambient air line; or
when an aircraft equipped with the aircraft air conditioning system is operated in cruising flight, the ambient air is initially conducted through the first section of the ambient air line, then through the second bypass line, then through the third section of the ambient air line and finally through the third bypass line.

4. The aircraft air conditioning system according to claim 1, further comprising at least one of:
a first valve arranged in the first section of the ambient air line and which is configured to control the flow of ambient air through the first section of the ambient air line;
a first pre-cooler, arranged in the first section of the ambient air line, for pre-cooling ambient air which has been compressed by the first ambient air compressor;
a second valve arranged in the first bypass line and which is configured to control the flow of ambient air through the first bypass line;
a third valve arranged in the second section of the ambient air line and which is configured to control the flow of ambient air through the second section of the ambient air line;
a fourth valve arranged in the second bypass line and which is configured to control the flow of ambient air through the second bypass line;
a second pre-cooler, arranged in the third section of the ambient air line, for pre-cooling ambient air before the thermal coupling between the third section of the ambient air line and the refrigerant circuit is brought about;
a trim air line which branches off from the third section of the ambient air line;
a fifth valve arranged in the fourth section of the ambient air line and which is configured to control the flow of ambient air through the fourth section of the ambient air line; or
a sixth valve which is arranged in the third bypass line and which is configured to control the flow of ambient air through the third bypass line.

5. A method for operating an aircraft air conditioning system, comprising:
conducting ambient air through an ambient air line connected to a mixer of the aircraft air conditioning system, to feed ambient air to the mixer;
conducting recirculation air through a recirculation air line connected to the mixer of the aircraft air conditioning system, to feed to the mixer recirculation air discharged from an aircraft area to be air conditioned; and
thermally coupling a refrigerant circuit of a refrigerating machine to the ambient air line and the recirculation air line to transmit heat from the ambient air flowing through the ambient air line and from the recirculation air flowing through the recirculation air line to the refrigerant circulating in the refrigerant circuit, before the ambient air and the recirculation air are fed into the mixer;
wherein the flow of ambient air through the ambient air line is controlled such that:
the ambient air is conducted firstly alternatively through either a first section of the ambient air line, in which first section there is arranged a first ambient air compressor, which is driven by a second electric motor, for compressing the ambient air flowing through the first section of the ambient air line, or through a first bypass line which runs parallel to the first section of the ambient air line;
the ambient air is then conducted alternatively through either a second section of the ambient air line, in which second section there is arranged a second ambient air compressor, which is driven by a third electric motor, for compressing the ambient air flowing through the second section of the ambient air line, or through a second bypass line which runs parallel to the second section of the ambient air line;
the ambient air is then conducted through a third section of the ambient air line, which third section is thermally coupled to the refrigerant circuit of the refrigerating machine; and
the ambient air is then conducted alternatively through either a fourth section of the ambient air line, in which fourth section there is arranged a turbine for depressurizing the ambient air flowing through the fourth section of the ambient air line, or through a third bypass line which runs parallel to the fourth section of the ambient air line.

6. The method according to claim 5, wherein at least one of
the refrigerant circulating in the refrigerant circuit of the refrigerating machine is a two-phase refrigerant, or
there is arranged in the refrigerant circuit of the refrigerating machine at least one of a refrigerant compressor, which is driven by a first electric motor, a condenser, a refrigerant collector, an expansion valve and a heat exchanger, in the form of an evaporator, which thermally couples the refrigerant circuit to the ambient air line.

7. The method according to claim 6, wherein the refrigerant circuit of the refrigerating machine is thermally coupled to the recirculation air line via a further heat exchanger, comprising a further evaporator.

8. The method according to claim 7, wherein the further heat exchanger is arranged in a connecting line that branches off from the refrigerant circuit of the refrigerating machine upstream of the heat exchanger which thermally couples the refrigerant circuit to the ambient air line and that opens back into the refrigerant circuit of the refrigerating machine downstream of the heat exchanger which thermally couples the refrigerant circuit to the ambient air line, wherein the connecting line branches off from the refrigerant collector arranged in the refrigerant circuit, and wherein there is also arranged in the connecting line at least one of a control valve configured to control the flow of refrigerant through the connecting line, and a further expansion valve.

9. The method according to claim 8, wherein at least one of
- the first ambient air compressor is controlled such that the first ambient air compressor compresses the ambient air flowing through the first section of the ambient air line to a pressure which substantially corresponds to a set cabin pressure in an aircraft cabin which is to be air conditioned; or
- the second ambient air compressor is controlled such that the second ambient air compressor compresses the ambient air flowing through the second section of the ambient air line to a pressure which is greater than the set cabin pressure in the aircraft cabin which is to be air conditioned, wherein water is separated out of the ambient air flowing through the fourth section of the ambient air line.

10. The method according to claim 8, wherein the flow of ambient air through the ambient air line is controlled such that, at least one of:

- when an aircraft equipped with the aircraft air conditioning system is operated on the ground, the ambient air is initially conducted through the first bypass line, then through the second section of the ambient air line, then through the third section of the ambient air line and finally through the fourth section of the ambient air line;
- when an aircraft equipped with the aircraft air conditioning system is climbing or descending, the ambient air is initially conducted through the first section of the ambient air line, then through the second section of the ambient air line, then through the third section of the ambient air line and finally through the fourth section of the ambient air line; or
- when an aircraft equipped with the aircraft air conditioning system is operated in cruising flight, the ambient air is initially conducted through the first section of the ambient air line, then through the second bypass line, then through the third section of the ambient air line and finally through the third bypass line.

* * * * *